United States Patent [19]

Dohm et al.

[11] 3,897,464

[45] July 29, 1975

[54] OXIDATION OF NAPHTHALENE TO 1,4-NAPHTHOQUINONE AND PHTHALIC ANHYDRIDE

[75] Inventors: Heinz Dohm; Karl Morgenstern, both of Krefeld; Ludwig Müller, Krefeld-Bockum; Rudolf Wiemers, Meerbusch all of Germany

[73] Assignee: Bayer Aktiengesellschaft, Leverkusen, Germany

[22] Filed: Apr. 12, 1973

[21] Appl. No.: 350,569

[30] Foreign Application Priority Data
July 12, 1972 Germany............................ 2234306
Mar. 15, 1973 Germany............................ 2312838

[52] U.S. Cl.................... 260/346.4; 260/396 R
[51] Int. Cl...................... C07d 63/18; C07d 49/66
[58] Field of Search....................... 260/346.4, 396 R

[56] References Cited
UNITED STATES PATENTS
2,574,511  11/1951  Toland, Jr........................ 260/346.4
2,989,544  6/1961  Saunders et al. ................ 260/346.4
FOREIGN PATENTS OR APPLICATIONS
1,055,124  1/1967  United Kingdom............. 260/396 R OTHER PUBLICATIONS
Fierz–David et al., Helv. Chim. Acta, (1947), pp. 237–265, Vol. 30.

*Primary Examiner*—Henry R. Jiles
*Assistant Examiner*—Bernard I. Dentz
*Attorney, Agent, or Firm*—Burgess, Dinklage & Sprung

[57] ABSTRACT

In the production of 1,4-naphthoquinone along with phthalic anhydride by the catalytic gas phase oxidation of naphthalene, the improvement which comprises maintaining in the reaction space a sulphur concentration of about 0.002 to about 0.1% by weight based on the naphthalene used. Advantageously the sulphur content is about 0.01 to 0.02%, the sulphur being in elementary form or conbined organic or inorganic form, e.g. sulphur dioxide. The preferred catalyst is vanadium pentoxide, alkali metal sulphate and alkali pyrosulphate and it is pretreated by conducting over it nitrogen containing 0.1 to 1% by volume of oxygen along with naphthalene and then a sulphur dioxide - air mixture. The yield of naphthoquinone is increased markedly compared with process effected in the presence of far more sulphur.

12 Claims, No Drawings

OXIDATION OF NAPHTHALENE TO 1,4-NAPHTHOQUINONE AND PHTHALIC ANHYDRIDE

The invention relates to a process for the production of 1,4-naphthoquinone with phthalic anhydride as by-product by the catalytic gas phase oxidation of naphthalene.

Processes are already known for the catalytic gas phase oxidation of naphthalene to 1,4-naphthoquinone and phthalic anhydride. Vanadium-containing catalysts and oxygen-containing gases, in particular air, as oxidation agents are generally used in these processes. Depending on the reaction conditions and the catalysts, a larger or smaller quantity of 1,4-naphthoquinone in relation to phthalic anhydride is obtained in the gas phase oxidation of naphthalene.

In German Pat. Nos. 1,135,883 and 1,219,465, for example, gas phase oxidations of naphthalene are described which are carried out in the presence of special catalysts and result in 1,4-naphthoquinone along with phthalic anhydride as the reaction product. The catalysts described in German Pat. No. 1,135,883 b se their stability in certain temperature ranges which results in decreasing yields of 1,4-naphthoquinone (German Pat. No. 1,219,465, column 1, lines 40 – 51).

The process disclosed in these patent specifications has the further disadvantage of only achieving a poor space/time yield. According to the process described in German Pat. No. 1,135,883, 1,4-naphthoquinone is obtained in space/time yields of 3.0 to 4.4 g per liter of catalyst per hour. In the process according to German Pat. No. 1,219,465 the space/time yield of 1,4-naphthoquinone amounts in large-scale production to 17 g per liter of catalyst per hour.

Even when using the phosphor-containing catalyst described in German OS No. 1,932,869 for the gas phase oxidation of naphthalene, in which 1,4-naphthoquinone forms along with phthalic anhydride, a space/time yield is obtained of only 14 g of 1,4-naphthoquinone per liter of catalyst per hour. The reaction product in addition contains maleic anhydride.

It is accordingly an object of the present invention to provide a process for the catalytic gas phase oxidation of naphthalene to naphthaquinone in high yield and at a high space/time yield.

These and other objects and advantages are realized in accordance with the present invention pursuant to which the catalytic gas phase oxidation of naphthalene to 1,4-naphthoquinone and phthalic anhydride is effected by maintaining a sulphur concentration of about 0.002 to about 0.1% by weight in the reaction space. Preferably this sulphur concentration amounts to about 0.005 to about 0.05, in particular about 0.01 to about 0.02 % by weight calculated on the naphthalene used.

The sulphur can be introduced in elementary or combined form. The introduction can be made directly into the reaction space or together with the starting product.

The sulphur can be added in the form of elementary sulphur or in combined form directly to the starting product prior to the evaporation of naphthalene. It can also be directly introduced into the evaporator or into the gaseous stream of the naphthalene after evaporation or into the oxygen-containing gas.

When adding solid or liquid sulphur compounds to the naphthalene, such sulphur compounds are preferably chosen which are themselves volatile without decomposition below the evaporation temperature of naphthalene.

The danger otherwise exists that residue from the decomposition of sulphur-like compounds will be deposited in the evaporator, this leading in its turn to a reduction in the efficiency of the evaporator or to clogging.

The most varied kinds of sulphur compounds are suitable for the addition of sulphur in combined form to the starting product. Volatile sulphur compounds are preferably used. Inorganic sulphur compounds can be employed, for example carbon disulphide, hydrogen sulphide and sulphur dioxide. As organic sulphur compounds there may be mentioned for example: thiols, such as methyl mercaptan, ethyl mercaptan, n-propyl mercaptan, iso-propyl mercaptan, n-butyl mercaptan, iso-butylmercaptan, iso-butenyl mercaptan, tert.-butyl mercaptan, n-dodecyl mercaptan, allyl mercaptan, benzyl mercaptan, ethane dithiol and monothioglycol; thiophenols, such as thiophenol, thio-o-cresol and thio-salicylic acid; thioalkanes, such as diethyl sulphide, dipropyl sulphide, ethyl propyl sulphide, thiodiglycolic acid, diallyl sulphide, allyl-$\beta$-oxyethyl sulphide, $\beta$-naphthyl-n-hexyl sulphide, thiocyclopentane, thiocyclohexane and ethylene sulphide; disulphides, such as diethyl disulphide, methylethyl disulphide, diallyl disulphide, diphenyl disulphide, dithiodiglycolic acid, dioxydiethyl disulphide and cystine; organic polysulphides, such as ethyl hydrogen trisulphide, diphenyl trisulphide, di-o-tolyl trisulphide, amyl tetrasulphide and dibenzyl pentasulphide; sulphonic acids and their derivatives, such as benzene sulphonic acid, p-toluene sulphonic acid, p-phenol sulphonic acid, p-aniline sulphonic acid (=sulphanilic acid), methane disulphonic acid and isethionic acid; sulphones, such as di-n-butyl sulphone, diacetonyl sulphone and 4-methyl-diphenyl sulphone; sulphoximines, such as dimethyl sulphoximine, sulphenic acids and their derivatives; sulphinic acids and their derivatives, such as benzene sulphinic acid, ethane sulphinic acid and p-toluene sulphinic acid; sulphoxides and their derivatives, such as diphenyl disulphoxide and diethyl sulphoxide; tetraphenyl sulphur; sulphinimines; trialkyl sulphonium salts, such as triethyl sulphonium ethyl sulphate; thiosulphonic acid ester, such as benzene thiosulphonic acid phenyl ester; thiosulphinic acid ester; thioaldehydes, such as trithioformaldehyde: thioketones, such as thiobenzophenone and thiocyclopentanone; monothioacetals, such as $\alpha,\beta'$-dialkoxydiethyl sulphide; mercaptals, such as diethyl acetone mercaptal; mercaptols, such as benzildiphenyl mercaptol; sulphur-containing heterocyclene, such as thiophenes, thiotoluenes, thioxenes, thionaphthene, thiophthene, azathiophenes, (diazathiophenes), trithiones (e.g. 4,5-dimethyl-trithione), thiopyrones, thiazines, thioxynthrene and thianthrene; thiocarboxylic acids and their derivatives, such as thioacetic acid, thiobenzoeic acid, dithiobenzoeic acid and thioformamide; thiocarbonic acid derivatives, such as carbon disulphide, carbon oxysulphide and thiocyanic acid; isothiocyanic acid, dithiocyanogen, thiocyano phenyl thiocyanogen, thiocarboxylic acid ester, xanthogenic acid derivatives, thiourethanes and dithiocarbamic acid.

The sulphur compounds can be added to the starting product in different forms. They can be admixed in gaseous, liquid or solid form with the naphthalene. Solutions of solid, liquid or gaseous sulphur compounds can likewise be prepared in the liquid starting product and a corresponding branch stream can be added in metered quantities by means of a pump to the main stream of naphthalene. Volatile sulphur compounds can also be conducted in gaseous form into the naphthalene stream after evaporation or into the oxygen-containing gas. In this case sulphur dioxide is preferably used.

When using sulphur in combined form such compounds or their mixtures, which contain sulphur in elementary form or in the form of sulphur compounds as impurities, can be used instead of pure compounds containing sulphur in the molecule. There may be used for example hydrocarbon fractions from the catalytic or thermal conversion of mineral oils or from coal tar which contain sulphur. It may prove advantageous to employ such sulphur-containing hydrocarbon fractions, which consist substantially of naphthalene, in order to avoid the introduction of foreign compounds into the starting products upon adding sulphur in elementary form or in the form of sulphur compounds. Pitcoal naphthalene can be used for example as an additive which has a relatively high content of sulphur compounds, for example 0.4 % (calculated as elementary sulphur).

In general the process can be carried out in the temperature range of about 250° to 500°C, for example about 300° and 500°C or about 320° and 450°C. Particularly preferred is the temperature range between about 350° and 410°C.

In general the reaction is carried out at atmospheric pressure. It can however be carried out at increased pressure up to about 10 atms, for example at 3 to 6 atms.

The process according to the invention can be carried out as a fixed bed process or also as a fluidized bed or turbulence layer process. The process according to the invention is preferably carried out as a fixed bed process. In general, air is used as the oxidation agent, in the solids bed process about 20 to 50 g, preferably about 30 to 40 g, of naphthalene being used per standard cubic meter of air, while in the fluidized bed or turbulence layer process up to 100 g of naphthalene can be used per standard cubic meter of air. Besides air other oxygen-containing gas mixtures, for example mixtures of oxygen with inert gases, such as nitrogen and/or carbon dioxide may also be used.

In general, the reaction gas leaving the reactor under the reaction pressure is cooled to temperatures between about 10°C and 120°C, for example between about 15°C and 30°C, and separated in a separator into a liquid or solid phase, which consists substantially of 1,4-naphthoquinone, phthalic anhydride and non-reacted naphthalene, and a gas phase. When using air as the oxygen-containing gas, the gas phase consists substantially of nitrogen, oxygen, carbon dioxide, steam and naphthalene. The gas phase can be recycled into the reaction. A branch stream can be removed from the recycle gas and hence a substantial part of the nitrogen brought in with the air and the gaseous by-products, such as carbon dioxide and steam, removed. By the introduction of oxygen, e.g. in the form of air, into the main stream the oxygen consumed during the reaction can be replenished. It is expedient to restrict the amount of oxygen at the entrance to the reactor so that the explosive range of the system is not reached in the reactor and during subsequent condensation. Work can be carried out at an oxygen concentration of about 6 to 30 % by volume, preferably about 15 to 25 % by volume, in particular about 20 to 22 % by volume, in the recycle gas.

The naphthalene used according to the process of the invention is so-called petronaphthalene (Ullmann, Encyclopedie der technischen Chemie, 13, 719 (1962).

Particularly advantageous results can be obtained if the sulphur concentration according to the invention is not adjusted until after a start-up period and then maintained throughout the reaction. When using reactors and catalysts as are customary for the oxidation of naphthalene to phthalic anhydride, it may be advantageous to adjust the sulphur concentration according to the invention after about 100 to 300 hours, preferably about 150 to 200 hours and to maintain this for the rest of the time.

It may prove advantageous to only partly react the naphthalene used, so that a liquid mixture of 1,4-naphthoquinone, phthalic anhydride and naphthalene is obtained after the condensation.

The working up of the reaction mixture and separation into its components can be carried out according to conventional processes, e.g. by washing or separating in the solids or fluids separator.

In general, the process according to the invention is carried out in the same apparatuses and with the same catalysts as are known for the oxidation of naphthalene to phthalic anhydride. For example, the catalysts to be used for the process according to the invention consist substantially of vanadium pentoxide, alkali metal sulphate and alkali metal pyrosulphate, these components preferably being applied to inert carrier material.

Particularly preferred ranges of the sulphur concentration to be maintained according to the invention which depend on the catalyst used and the test conditions selected can be determined by means of simple tests.

A sulphur concentration of about 0.01 to 0.02 % by weight, based on the naphthalene used, is particularly favourable for example for a catalyst, which consists of about 10% by weight of $V_2O_5$, 50 to 70% by weight of silicic acid and 20 to 40% by weight of potassium sulphate, at a reaction temperature of about 380° to 400°C.

It may be advantageous to subject the catalyst to pretreatment at the start of the process according to the invention. A nitrogen stream containing about 0.1 to 1 % by volume of oxygen is conducted in an amount of, for example, 0.5 to 4 standard cubic meters/h per liter of catalyst over the catalyst during a period of about 1 to 100 hours, preferably during a period of about 10 to 30 hours, at temperatures as are necessary for carrying out the process, e.g. about 350° to 450°C, preferably at about 380° to 410°C, with the addition of naphthalene in approximately the amount as is used for carrying out the process, e.g. about 0.1 to 200, preferably about 20 to 150 g/h of naphthalene per liter of catalyst. Thereafter an $SO_2$/air mixture is conducted over the catalyst over a period of about 0.5 to 2 hours. The $SO_2$/air mixture contains about 0.2 to 5.0% by volume of $SO_2$ and is conveyed in an amount of about 0.5 to 4 standard cubic meters/h per liter of catalyst over the catalyst.

1,4-naphthoquinone is a valuable starting product for the production of technically important substances. 1,4-naphthoquinone can be reacted, for example, to anthraquinone, which, in its turn, represents an important starting compound for the production of dyestuffs.

The process according to the invention shows the following significant advantages over the prior art:
1. The catalyst can be used more intensively.
2. Despite the increased catalyst load the space/time yield is considerably increased over the prior art. For example, space/time yields of about 40 g/l per hour of 1,4-naphthoquinone are obtained according to the process of the invention.
3. The process of the invention can futhermore be carried out over long periods of time, e.g. up to 6,500 hours, while the activity of the catalyst remains constant.
4. A further considerable advantage of the process of the invention consists in that the production of 1,4-naphthoquinone with a constantly high yield can be carried out in the same plant and with the same catalysts as are used according to the prior art for the production of phthalic anhydride by air oxidation of naphthalene without any costly changes whatsoever being required. It is merely necessary to maintain the sulphur concentration according to the invention in the reaction space which is usually possible without the installation of additional pieces of apparatus.

EXAMPLES

The apparatus used in the following Examples consists of a reaction tube with an internal diameter of 25 mm and 3 m long. This reaction tube — one unit of a technical reactor — is surrounded by a salt melt which is constantly circulated by pumping and whose temperature is controlled and regulated by three thermocouple elements arranged at different depths of immersion. 1,000 ml of a catalyst are introduced into the upright reaction tube which consists of 49.9% by weight of silica, 30.0% by weight of sulphate, 13.2% by weight of potassium and 6.9% by weight of $V_2O_5$.

The catalyst temperature is measured in the reaction zone by a thermocouple element which is arranged in a protection tube and whose height can be adjusted. With the aid of a salt bath the catalyst temperature is constantly kept at the temperature given in the Examples.

At a temperature of 378°C 2.75 standard cubic meters/h of air, which are charged with 100 g of naphthalene, are conducted through the reaction tube. The naphthalene is evaporated in the evaporator with a capacity of about 3,500 ml which is arranged in front of the reaction tube to an appropriate extent and admixed with the air stream. The naphthalene/air mixture emerging from the evaporator has a temperature of about 110°C to 120°C. The product stream leaving the reaction tube enters into a solids separator, a horizontal tube provided with baffle plates and externally cooled with water which has an internal diameter of approximately 50 cm in which the solid reaction products separate at normal temperature and are removed at four hourly intervals.

Analysis of the individual components of the reaction product is carried out by qualitative and quantitative gas chromatography: in addition 1,4-naphthoquinone is determined polarographically and phthalic anhydride potentiometrically.

In the following Example 1 the naphthalene oxidation is described according to the prior art. The process of the invention is illustrated in Examples 2 to 10.

EXAMPLE 1 (FOR COMPARISON)

In a long-term experiment carried out according to the general method of working as described in the aforegoing tar naphthalene is used with a sulphur content of 0.4% by weight as corresponds to the prior art for the catalytic gas phase oxidation of naphthalene to phthalic anhydride. 90 g/h of solid reaction product with a content of 95% by weight of phthalic anhydride and 3% by weight of 1,4-naphthoquinone are obtained.

EXAMPLE 2

The process is carried out according to the general method of working described above. A petronaphthalene with a sulphur content of less than 10 ppm is used to which 3.6 % by weight of a tar naphthalene with a sulphur content of 0.4 % by weight are added continuously. By applying this measure a sulphur concentration of 0.015 % by weight based on the naphthalene used is always maintained in the reaction space. After a running time of 110 hours 105 g/h of solid reaction product with a content of 25 % by weight of 1,4-naphthoquinone and 45 % by weight of phthalic anhydride are obtained.

EXAMPLE 3

The process is carried out according to the general method of working described above exept that the experiment is preceded by treating the catalyst in the following way: 1.5 standard cubic meters/h of a nitrogen stream containing 1% by volume of oxygen as well as 100 g/h of a naphthalene with a sulphur content less than 10 ppm are conducted over the catalyst located in the reaction tube during a period of 24 hours at a temperature of 400°C. Thereafter 1 standard cubic meter/h of a dry sulphur dioxide/air mixture containing 2% by volume of $SO_2$ is conducted over the treated catalyst for one hour at the same temperature.

After this pretreatment procedure the process is carried out according to the general method of working described above for 200 hours, using a naphthalene with a sulphur content of less than 10 ppm. Thereafter the same naphthalene mixture as described in Example 2 is used, so that a sulphur concentration of 0.015% by weight based on the naphthalene used is always maintained in the reaction space. 108 g/h of solid reaction product with a content of 35% by weight of 1,4-naphthoquinone and 47% by weight of phthalic anhydride are obtained. These values are maintained until the end of the experiment. The running time of the experiment amounts to a total of 6,500 hours.

EXAMPLE 4

The process is carried out according to Example 3 except that instead of adding the naphthalene mixture described in Example 2 a naphthalene having a sulphur content of less than 10 ppm is used to which 0.015% by weight of elementary sulphur is added. The elementary sulphur is dissolved in the previously melted naphthalene prior to this being introduced into the evaporator. After the addition of sulphur an amount of solid reaction product of 111 g/h with 35% by weight of 1,4-naphthoquinone and 47% by weight of phthalic anhydride is obtained throughout the entire experiment. The experiment lasted for a period of 1,000 hours.

EXAMPLE 5

The process is carried out according to Example 4 except that instead of elementary sulphur, thiophene is added in an amount of 0.04% by weight based on the naphthalene used. The results are the same as in Example 4.

EXAMPLE 6

The process is carried out as in Example 4, except that instead of elementary sulphur, thionpahthene is added in an amount of 0.063% by weight based on the naphthalene used. After the addition of thionaphthene an amount of solid reaction product of 107 g/h with 35% by weight of 1,4-naphthoquinone and 47% by weight of phthalic anhydride is obtained over the entire duration of the experiment. The experiment lasted for a period of 1,000 hours.

EXAMPLE 7

The process is carried out according to the general method of working described above, except that after 200 running hours 0.03% by weight of sulphur dioxide gas based on the naphthalene used, is continuously added to the initial air stream. In this way together with the sulphur contained in the initially used naphthalene, a sulphur concentration of 0.015% by weight, based on the naphthalene, is maintained in the naphthalene/air mixture. After the addition of the sulphur dioxide gas the amount of solid reaction product of 110 g/h with 35% by weight of 1,4-naphthoquinone and 47% by weight of phthalic anhydride is maintained over the entire duration of the experiment which lasts for 1,000 hours.

EXAMPLE 8

When using the method of working as described in Example 3, but without pretreating the catalyst, 105 g of solid reaction product are obtained after 350 hours which contain 28% by weight of 1,4-naphthoquinone and 45% by weight of phthalic anhydride. After 550 running hours 35% by weight of 1,4-naphthoquinone with 45% by weight of phthalic anhydride are obtained.

EXAMPLE 9

The process is carried out according to Example 3, except that the naphthalene/air mixture is conducted at a temperature of 352°C through the reaction tube. After a running time of 200 hours, naphthalene having a higher content of sulphur is added to the initially used naphthalene in such an amount that a sulphur concentration of 0.015% by weight is continuously maintained in the naphthalene. 105 g/h of solid reaction product with a content of 25% by weight of 1,4-naphthoquinone and 27% by weight of phthalic anhydride are obtained.

EXAMPLE 10

The process is carried out according to Example 3, except that the naphthalene/air mixture is conducted through the reaction tube at a temperature of 410°C. After a running period of 200 hours, naphthalene having a high content of sulphur is added to the initially used naphthalene in such an amount that a sulphur concentration of 0.015% by weight is always maintained in the naphthalene. 101 g/h of solid reaction product with a content of 30% by weight of 1,4-naphthoquinone and 60% by weight of phthalic anhydride are obtained.

It will be appreciated that the instand specification and examples are set forth by way of illustration and not limitation, and that various modifications and changes may be made without departing from the spirit and scope of the present invention.

What is claimed is:

1. In the production of 1,4-naphthoquinone along with phthalic anhydride by the catalytic gas phase oxidation of sulfur free naphthalene, the improvement which comprises maintaining in the reaction space a sulphur concentration of about 0.002 to about 0.05% by weight based on the naphthalene used.

2. The process according to claim 1, wherein the sulphur concentration amounts to about 0.005 to about 0.05% by weight based on the naphthalene used.

3. The process according to claim 1, wherein the sulphur concentration amounts to about 0.01 to about 0.02% by weight based on the naphthalene used.

4. The process according to claim 1, wherein the sulphur concentration is maintained by the introduction of sulphur in elementary or combined form.

5. The process according to claim 4, wherein the sulphur is introduced in the form of sulphur dioxide.

6. The process according to claim 1, wherein the starting material is petronaphthalene.

7. The process according to claim 1, wherein the reaction is carried out at a temperature of about 320° to 450°C.

8. The process according to claim 1 wherein the reaction is carried out at a temperature of about 350° to 410°C.

9. The process according to claim 1, wherein the reaction is carried out as a fixed bed process.

10. The process according to claim 1, wherein said catalyst consists essentially of vanadium pentoxide, alkali metal sulphate and alkali metal pyrosulphate.

11. The process according to claim 1, including the steps of pretreating the catalyst by conducting thereover about 0.5 to 4 standard cubic meters/h of a nitrogen stream containing about 0.1 to 1% by volume of oxygen at a temperature of 300° to 450°C while adding 0.1 to 200 g/h of naphthalene to the nitrogen stream, and thereafter conducting over the catalyst a sulphur dioxide/air mixture containing about 0.2 to 5.0% by volume of sulphur dioxide in an amount of 0.5 to 4 standard cubic meters/h/liter of catalyst.

12. The process according to claim 11, wherein said catalyst consists essentially of vanadium pentoxide, alkali metal sulphate and alkali pyrosulphate, and the reaction is carried out in a solid bed at a temperature of about 350° to 410°C.

* * * * *